United States Patent [19]
Rod et al.

[11] Patent Number: 5,215,035
[45] Date of Patent: Jun. 1, 1993

[54] APPARATUS FOR THE HANDLING OF LIVE FISH AND FISH FRY AND USE OF THE APPARATUS

[76] Inventors: Torben Rød; Leivur Hansen, both of Gronlandsvej 9Å, DK-8700 Horsens, Denmark

[21] Appl. No.: 768,085

[22] PCT Filed: Apr. 4, 1990

[86] PCT No.: PCT/DK90/00085
§ 371 Date: Oct. 1, 1991
§ 102(e) Date: Oct. 1, 1991

[87] PCT Pub. No.: WO90/11692
PCT Pub. Date: Oct. 18, 1990

[30] Foreign Application Priority Data
Apr. 5, 1989 [DK] Denmark .................................. 1642

[51] Int. Cl.5 .............................................. A01K 61/00
[52] U.S. Cl. ...................................................... 119/3
[58] Field of Search ..................... 119/3, 97.1, 98, 103

[56] References Cited
U.S. PATENT DOCUMENTS

| | | | |
|---|---|---|---|
| 3,774,578 | 11/1973 | Randolph et al. | 119/97.2 |
| 3,820,545 | 6/1974 | Jefferts | 119/3 X |
| 4,672,967 | 6/1987 | Smith | 119/3 X |
| 5,103,767 | 4/1992 | Haugland et al. | 119/3 |

FOREIGN PATENT DOCUMENTS

| | | |
|---|---|---|
| 0272994 | 6/1988 | European Pat. Off. |
| 23346 | 5/1913 | Norway . |
| 65445 | 11/1942 | Norway . |
| 88914 | 3/1957 | Norway . |

Primary Examiner—Robert P. Swiatek
Attorney, Agent, or Firm—Antonelli, Terry, Stout & Kraus

[57] ABSTRACT

An apparatus for separate handling of live fish including a plurality of holders placed radially on a turntable mounted on a stainless steel table on which is also mounted a basin for the fish, with a chute and a vaccination apparatus and a control cabinet. By rotating the turntable, a fish in each holder is moved to various positions, with the bottom of each holder being openable so that the fish may be released and, through an outlet tube, be guided to a basin with water.

13 Claims, 5 Drawing Sheets

APPARATUS FOR THE HANDLING OF LIVE FISH AND FISH FRY AND USE OF THE APPARATUS

FIELD OF THE INVENTION

The invention relates to an apparatus for separate handling of live fish and fish fry.

BACKGROUND OF THE INVENTION

In industrial fish production in basins, pools or marine fish farms with basins formed by nets, the need arises on certain occasions to handle the fish separately, e.g. in connection with vaccination of fish or by sorting according to size or sex.

The apparatus according to the invention will be explained in connection with the vaccination of fish, but it may also be used in the sorting of fish or fish fry, also simultaneously with a vaccination of the fish.

Today fish or fish fry are vaccinated in two ways. The fish may be vaccinated separately by an automatic manual vaccination apparatus, but this is a physically taxing job as the fish at the same time must be held manually and vaccinated in a certain spot. During this operation the gills or scales of the fish may easily be damaged if the fish is held too tightly, or the vaccination may be effected imprecisely. Fish or fish fry may also be vaccinated in a basin by dosing the vaccine directly into the water, but this method results in a great inaccuracy concerning how large a dose the individual fish receives. Furthermore, the drainage water will be polluted by surplus vaccine.

SUMMARY OF THE INVENTION

The object of the invention is to describe an apparatus for separate and mechanical handling of live fish and fish fry in such a way that the fish are always held in a definite position in the apparatus and also not held for longer than necessary for vaccination or for measurements of the fish.

In accordance with the present invention, an apparatus for separate handling of live fish and fish fry is provided with the apparatus including a plurality of holders mounted on a common transport adapted to move the holders sequentially between the plurality of positions. Means are provided for enabling a separate introduction of the fish or fish fry into the respective holders with a further means being provided for detecting a presence of fish in the holder. Each of the holders comprises at least two mutually movable parts arranged so as to grip the fish placed in a vertical position with a tail of the fish pointing in an upward direction. Each of the holders includes means for releasing the fish, and the common transport includes a turntable on which the holders are supported on radial arms including positioning means for the movable parts of the holders. The positioning means are constructed in such a manner that the positioning takes placed in dependence upon an angular position of the turntable. One of the movable parts of the holder includes a bottom portion which is hinged to a bottom edge of the movable part.

By virtue of the above noted features of the present invention, the fish are guided separately to a holder and, as soon as the system automatically detects that a fish is correctly placed in the holder, the holder is moved to one or more positions in the apparatus. Furthermore, the fish is released and glides through an outlet tube down into a basin filled with water. The apparatus makes mechanical handling of live fish possible in such a manner that fish passing the apparatus are each positioned in the same manner in a respective holder.

In accordance with further features of the present invention, the apparatus further includes at least one outlet tube disposed at least at one of a plurality of positions into which the holders are moved, with the outlet tubes being placed under bottoms of the holders, and with each outlet tube comprising a cover adapted to be positioned by a work cylinder. The bottom and the cover are provided with means adapted to interact with each other so that the bottom is operated in a downward direction.

In accordance with still further features of the present invention, a vaccination apparatus, preferably, an automatic vaccination apparatus, is disposed opposite at least one of the plurality of positions into which the holders are moved. A control circuit controls the vaccination apparatus and remaining functions of the apparatus. The vaccination apparatus includes a means for cleaning the hypodermic needle as well as a means for disinfecting the hypodermic needle. Moreover, at least one water pipe is arranged so as to spray the respective holders with water at least at one of the plurality of positions of the holders.

By virtue of the features of the present invention, it is possible, for example, to ensure a completely correct vaccination because the holder is stopped for a short time while the vaccination takes place. The spraying with water ensures that the fish are not damaged by passing the apparatus and, in practice, the fish only stay for a few seconds in the apparatus before they are again back in a basin filled with water.

In accordance with yet further features of the present invention, each holder includes exchangeable soft plastic linings having a smooth and soft surface. By virtue of the construction of the holder in this fashion, it is possible for the holder to grip the fish carefully without damaging the fish in any manner. The linings are exchangeable, partly so that they may be exchanged if they are damaged or worn on the sides turned toward the fish and partly to diminish a possible danger of contamination. The linings are, of course, designed so that they may be cleaned and disinfected.

Additionally, by virtue of the provision of the turntable in accordance with the present invention, a simple and more dependable apparatus is achieved in which the holders may more quickly be shifted to the individual position so that the fish only need stay in the apparatus for a very short time. Furthermore, it is possible to achieve a very precise control of the apparatus.

Moreover, by providing that one of the movable parts of the holder includes a bottom which is hinged to the bottom edge of the part, which bottom contacts a table top or a portion thereof which is arranged tiltably with respect to a chute which guides the fish separately to the holder, and by providing at least one outlet tube which is placed at least at one of the particular positions in which the holders are moved, which outlet tubes are placed under the bottoms of the holders, with each tube comprising a cover which may be positioned by a work cylinder, and providing interacting means between the bottom and the cover enabling the bottom to be opened downwardly, the fish may be extracted from the holders in a very simple manner. In this connection, a simultaneous opening of the bottom and an opening of the holder takes place so that the fish may fall freely through the open bottom of the holder through the outlet tube and into the water basin. By making the table or a portion of the table tiltable, it may be adjusted with respect to the chute which guides the fish separately to the holders whereby the fish easily slide into the right place in the holders. The angle of tilt of the table depends upon, among other things, the size of the fish.

In accordance with still further features of the present invention, a further apparatus may be placed in opposition to at least one of the positions into which the holders are moved, with such further apparatus being, for example, a vaccination apparatus, preferably, an automatic vaccination apparatus. A control circuit may be provided for controlling the automatic vaccination apparatus, with such control circuit also controlling the remaining functions of the apparatus. The vaccination apparatus includes a means for cleaning a hypodermic needle as well as a means for disinfecting such needle. As can readily be appreciated, the additional apparatus may also be an apparatus for measuring a size of the fish or other qualities thereof, and the apparatus may subsequently sort the fish, for example, by virtue of the provision of a plurality of individual outlet tubes.

The apparatus of the present invention may also comprise a basin for the fish with at least one chute correctly orienting the fish or fish fry down into the holders of the apparatus.

With an apparatus such as proposed by the present invention, it may, for example, be possible to vaccinate up to over 5,000 fish per hour, that is, in such a way that all fish are correctly vaccinated both as regards to dose of vaccination and which is very important, so that the vaccination of all fish is correctly carried out, usually immediately in front of the pelvic fin.

Furthermore, the handling of the fish is gentle, even at the great speed of handling, and completely without damage to scales or gills and the fish are out of water for a very small period of time

BRIEF DESCRIPTION OF THE DRAWINGS

The present invention is further explained in the following description with reference to a preferred embodiment as shown in the accompanying drawings, wherein.

DETAILED DESCRIPTION

Figure 1:
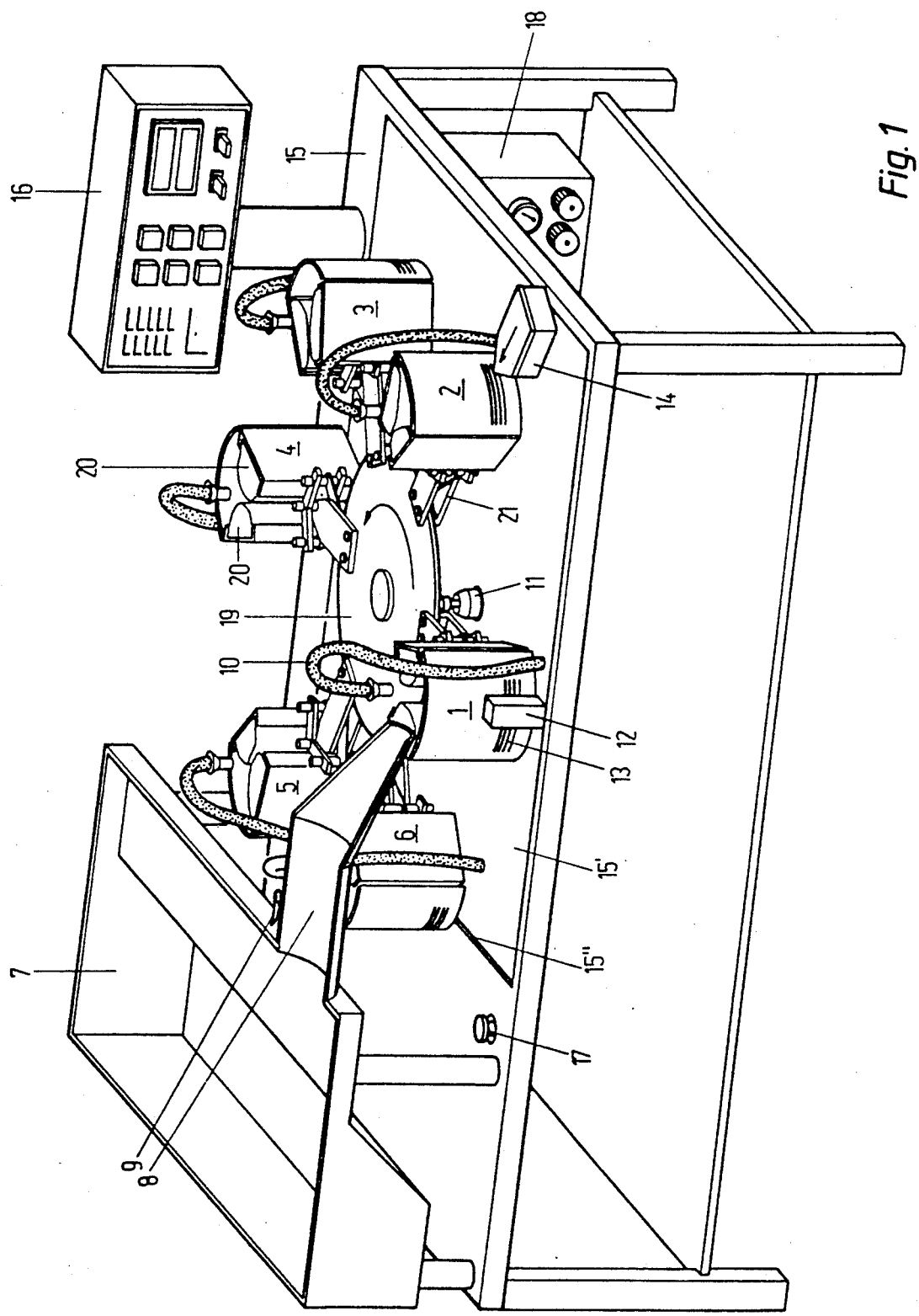
FIG. 1 is a schematic perspective view of the apparatus according to the present invention.

Referring now to the drawings wherein like reference numerals are used throughout the various views to designate like parts and, more particularly, to FIG. 1, according to this figure, an apparatus for separate handling of live fish and fish fry is mounted on a table 15 with a planar top, with the table 15 being, preferably, made of stainless steel. The apparatus is constructed to vaccinate fish which are simultaneously sorted into breeding fish and non-breeding fish.

The fish are manually lifted from a basin 7 which contains water so that the fish may stay there until they are guided through the apparatus for vaccination. The fish are manually guided, one at a time, to a chute 8 and turned with the nose of the fist pointed toward an outlet of the chute 8 and with a dorsal fin pointed toward the operator standing in front of the table at the chute.

The fish will hereafter glide by themselves down into the first holder 1. The shown embodiment has six holders 1–6 mounted on a turntable 19 by radial arms 21. It is obvious to an expert in the field that the holders might also have been mounted on a conveyor chain or on another means of transport, and that the use of a turntable is only an example of how the invention may be implemented in practice. The holders will be explained in the following with reference to FIGS. 2–5.

When a fish is in its place in the holder, i.e. with the tail pointing upwards, the sensor 12, which may be a photo cell arrangement which may "look" into the holder 1 through slots 13, gives a signal for the start of the turntable 19. At the start of the turntable 19 the holder 1 is closed, and the inner surfaces 20 of the holder, which consist of soft linings, are pressed gently against the sides of the fish and hold it.

If the fish, for example, is non-breeding, the contact 9 is activated, after which the apparatus will discharge the non-breeding fish and breeding fish through different outlet tubes so that they are sorted into breeding fish and non-breeding fish after the vaccination.

All of the turntable is turned one sixth of a revolution until the holder 1 is placed at the position of the holder 2 opposite the vaccination apparatus 14. After the vaccination, the turntable is turned further, while, simultaneously with the vaccination, the next fish is guided down into the holder 6, which is now placed in the position of the holder 1 in FIG. 1. Exit openings, which are controlled by the control system of the apparatus, may be arranged in the top of the table 15 under the positions of the holders 4 and 5. The control system is mounted in a control cabinet 16. The opening and closing of the exit openings, explained more fully hereinbelow, is effected in dependence upon, among other things, whether the control switch 9 is activated or not.

Water hoses 10 with nozzles are placed at all stop positions so that the fish may be sprayed and kept wet.

A compressed air control unit 18 is placed under the table and an emergency stop switch 17 for stopping the apparatus is placed at the position of the operator.

A stopping device 11 may be placed on the table top, which device, for example, may be pneumatically raisable and lowerable and controlled by the control circuit in the the control cabinet, so that the turntable may be brought to a halt in a completely well defined position. The stopping device 11 is shown in FIG. 1 as placed at the position of the holder 1 solely for the sake of clearness of understanding. In practice it may be placed at the stop position at which it is most important that the turntable stops precisely, which in the present example will be opposite the vaccination apparatus 14.

The electric control system in the control cabinet 16 will normally comprise a PCL, necessary operation keys, fish counters, start and stop switches etc. The counting system may normally be designed so that it counts the number of fish vaccinated and the number thereof in breed and not in breed. The counting system may naturally be adjusted to zero and may further be designed for various uses.

In FIG. 1 the table 15 is shown horizontal and planar. In practice it has turned out to be advantageous if at least a part of the table marked 15' may be tilted around the side edge 15" so that all of the turntable 19 and the vaccination unit is tilted too. Hereby the tilt of the turntable 19 may be adjusted so that the fish may more easily slide correctly from the chute 8 down into the respective holders 1–6. The part 15' of the table 15 may be tilted between 0° and 90°, and experiments have proved that the part of the table 15' is advantageously tilted from 40° to 65° depending on the size of the fish. Hereby the action upon the fish is minimized while at the same time the speed by which the fish are guided into the holders is maximized.

Figure 2:
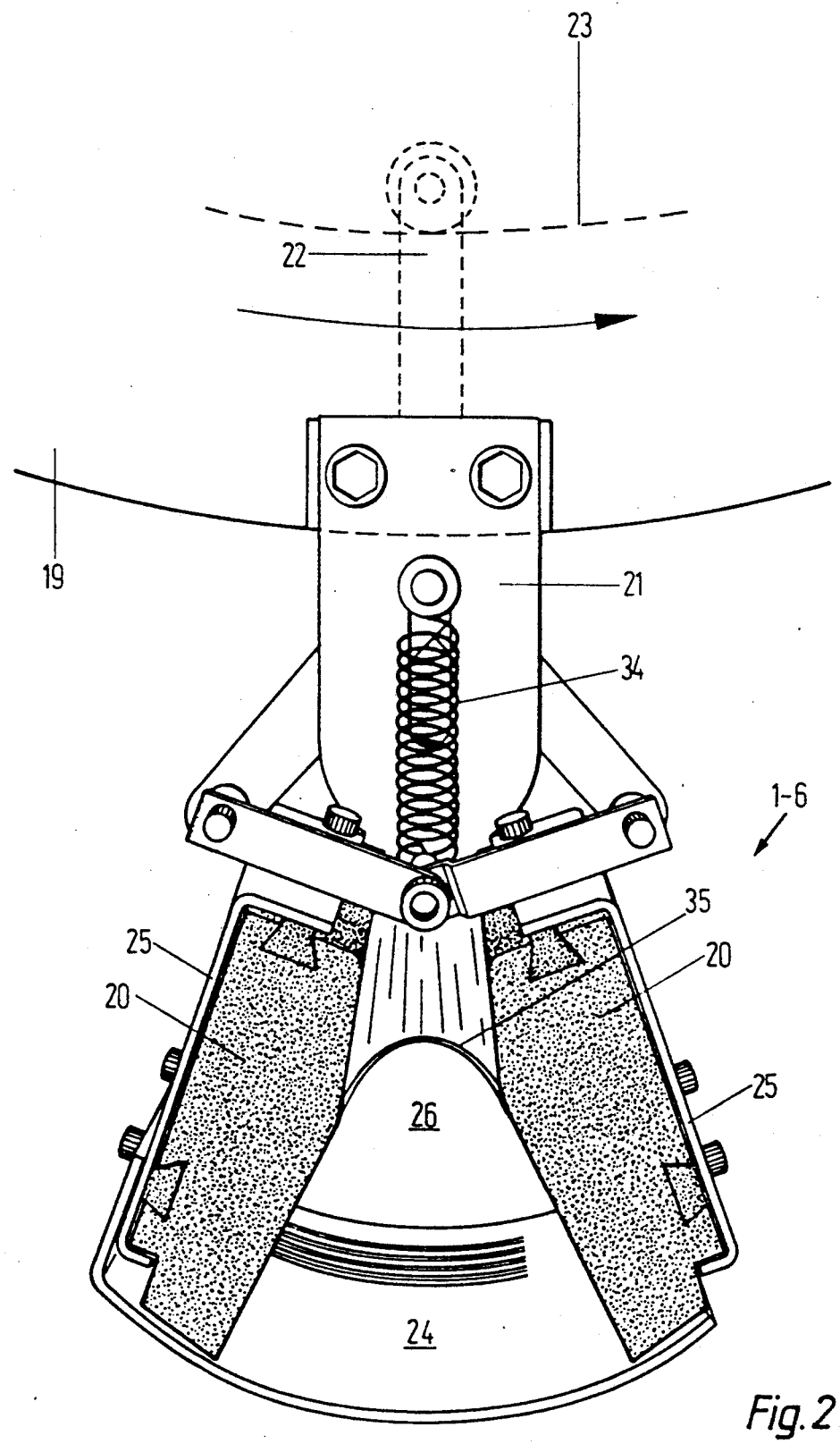
FIG. 2 is a top view, on an enlarged scale, of a holder of the apparatus of the present invention in an open state.

In FIG. 2 one of the holders 1–6 is shown from above. Each holder 1–6 includes two side plates 25 of which one supports the curved front plate 24 and a bottom plate 26 which is connected by hinges to the side plate at the lower left side. The side plates 25 are positioned by a positioning arm 22 engageable with a lazy-tongs mechanism in the radial arms 21. The positioning arm 22 ends in a roll which is guided by a curved disk 23. The disk 23 hereby determines the adjustment of the side plates 25, for example, the extent of opening of the respective holders. The closing power, which determines how strongly the sides may squeeze the fish, is determined by a spring 34.

Two replaceable linings 20 are placed in each holder, with the linings being molded from polyurethane with a soft even surface. The linings 20 are molded into such a shape that they will only squeeze the fish lightly and the soft even surface guarantees that gills and scales of the fish are not damaged. A rubber membrane 35 is attached between the linings 20 so that the fish under no circumstances will contact the activating mechanisms.

Figure 3:
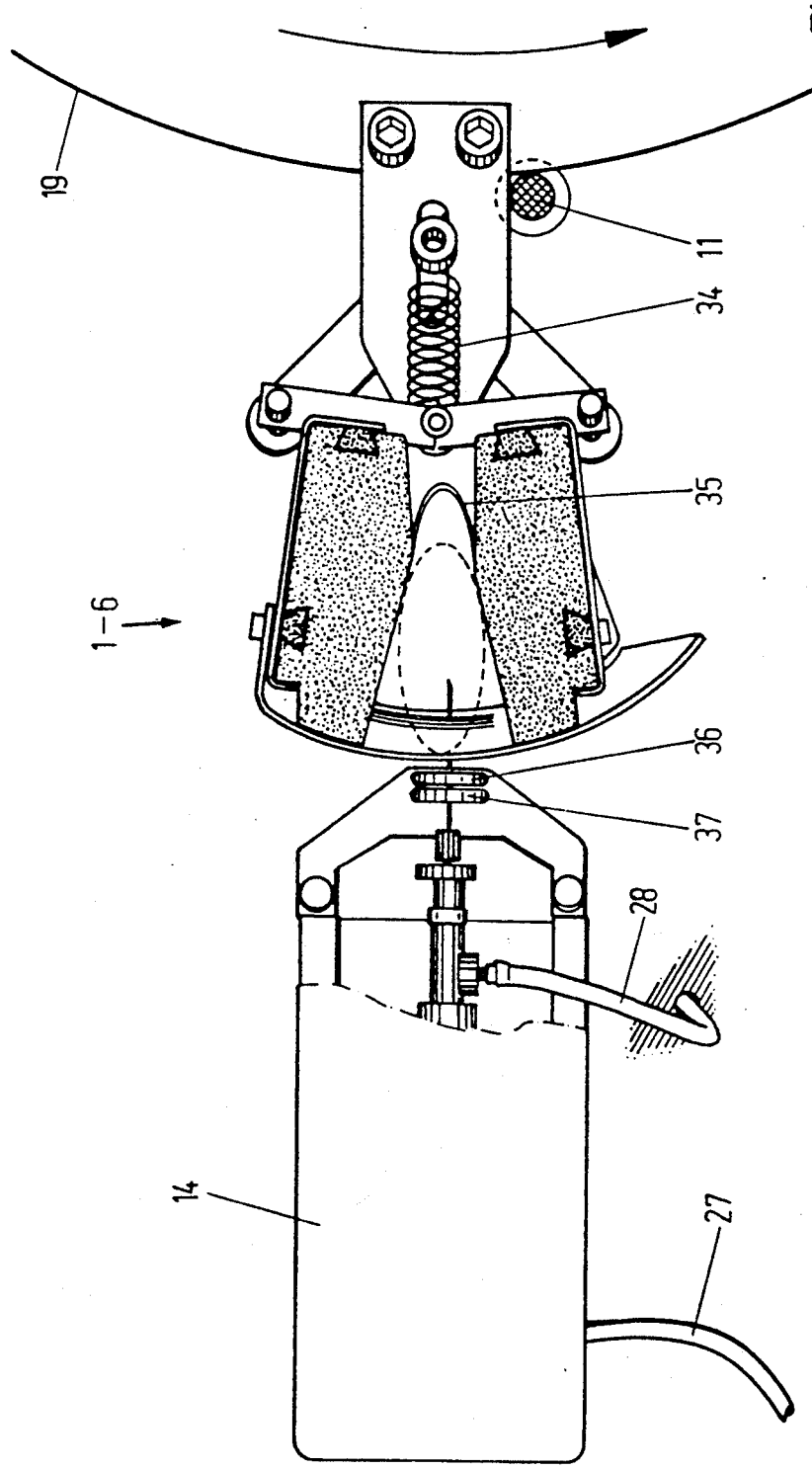
FIG. 3 is a top view of the holder of FIG. 2 together with an apparatus for vaccination.

FIG. 3 shows a holder during the vaccination procedure of a fish which is indicated by a dotted line. The vaccination apparatus 14 is provided with compressed air via a hose 27 and vaccine via a hose 28. The vaccination apparatus is activated when the radial arm of the of the holder abuts against the stopping means 11, and the holder will now be in the correct position opposite the vaccination apparatus 14. After this, a cylinder in the vaccination apparatus will be activated and the hypodermic needle inserted in the fish through one of the slits 13 in the holder. A further cylinder activates the syringe whereafter the cylinders are returned to their original positions and the apparatus is ready for the next vaccination. At each vaccination the needle is inserted through two disk shaped parts 36 and 37. The part 36 is a plastic or rubber membrane which cleans the needle, and the part 37 may be, for example, a felt disk which is continuously provided with methylated spirits so that the needle is disinfected whereby the possibility of transfer of contagious infection from a diseased fish to a succeeding fish is eliminated. After this the stopping means 11 is lowered pneumatically and the turntable 19 is moved on.

Figure 4:
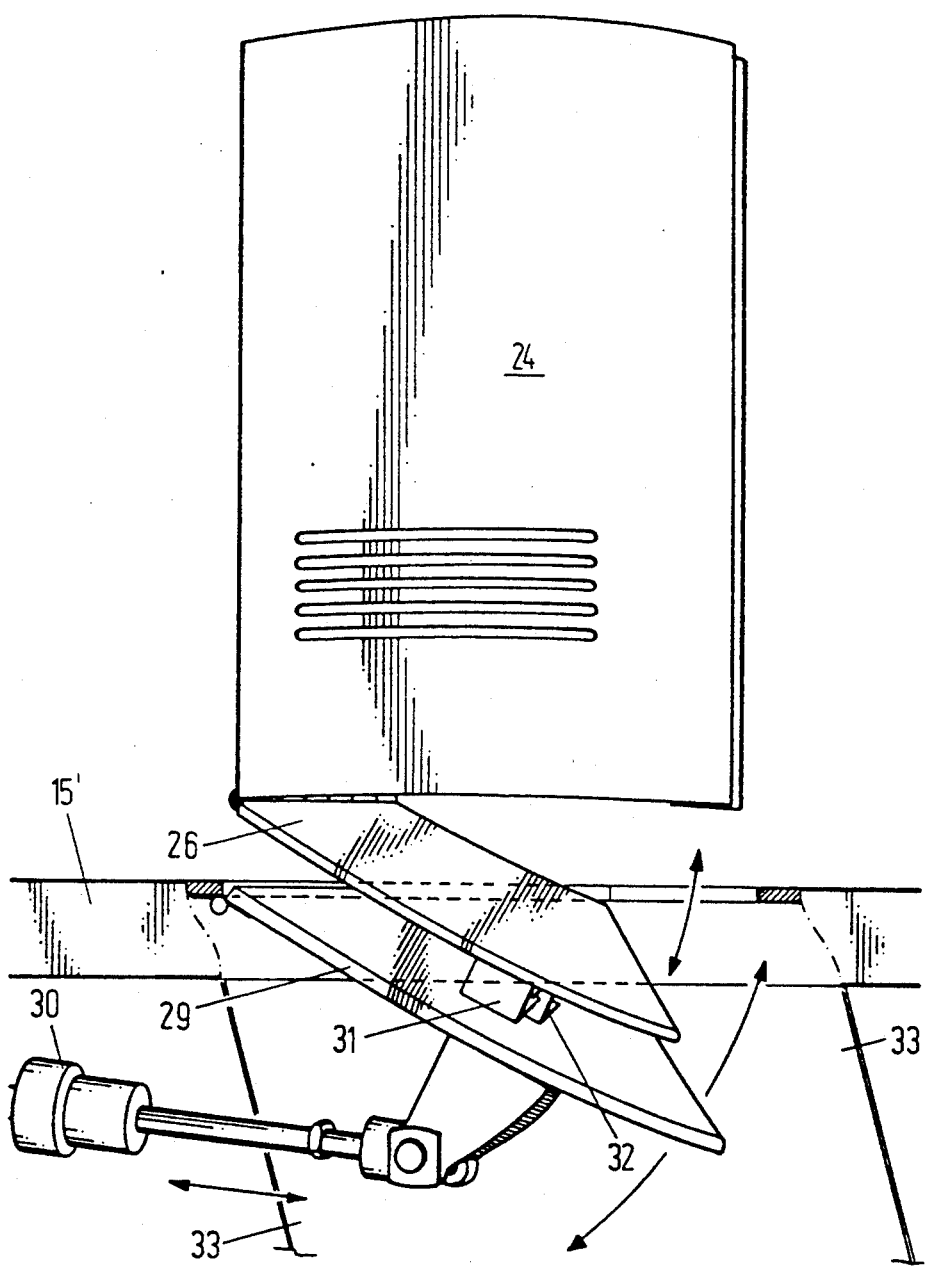
FIG. 4 is a view of a holder as seen in a radial direction and with a partially opened bottom plate.
Figure 5:
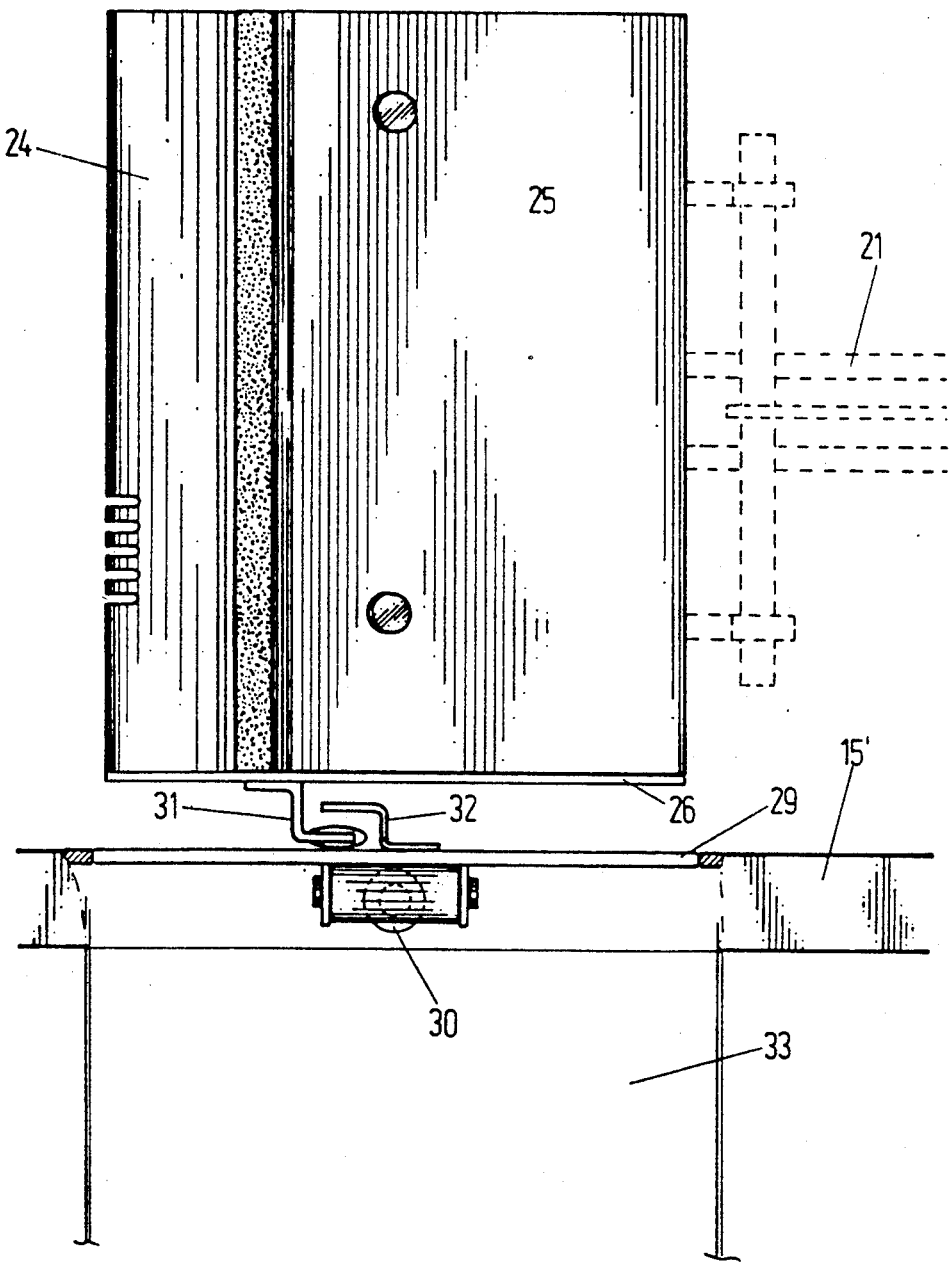
FIG. 5 is a view of the holder of FIG. 4 as seen from the other side with a closed bottom plate.

The discharging of the fish from holders 1–6 will be explained with reference to FIGS. 4 and 5 of the drawings, in which FIG. 5 shows the holder in FIG. 4 as seen from the right, but with the bottom flap closed. FIG. 4 shows that each holder has a bottom flap 26 which is hinged to the bottom edge of one of the sides of the holder. The part 15' of the table top 15 is provided with a hinged cover 29 which, by an activating cylinder 30 or in some other way, may open and close the access to an outlet tube 33. The discharge system may also be designed the other way around, that is, by merely providing a sufficiently large opening in the plate 15' so that the bottom flap 26 is turned upwards as soon as it passes over the opening. An arm may be placed at the terminating edge of the opening as seen in the direction of revolution of the turntable 19, which arm closes the bottom flap before it reaches the terminating edge of the opening. In this embodiment the bottom flap system will function substantially faster because there is no need for an activating cylinder for opening and closing the bottom flap 26 via a cover 29. The supporting means 31 will be replaced by a roll or the like which bears against the plate 15' when the bottom flap 26 is closed.

The bottom flap 26 of the holder is kept closed by a downwardly turned supporting means 31 which bears against the plate 15'. The supporting means 31 is provided with a friction-reducing coating because it will slide on the plate 15' when the turntable 19 is moved. A gripping means 32 is placed on the cover 29 which is hinged to the plate 15' which gripping means may catch the supporting means 31 if the bottom of the holder is to be opened as shown in FIG. 4.

The apparatus may be employed directly or be adjusted for fish of different sizes and shapes. The special configuration of the linings 20 and their simultaneous movement towards or away from each other will result in each fish sliding down into the holder in the correct position being held in such a manner that its vertical centerline will always be placed in the same way so that the hypodermic needle will always hit correctly. Furthermore, the vaccination apparatus 14 is adjustable in height and each holder has a number of slits 13 in the curved front plate 24.

The apparatus shown in the drawings with six holders may vaccinate up to 2500 fish an hour of fish of the sizes 7 g–3.0 kg depending on the size and design of the grippers.

It is also possible to arrange twelve grippers on the turntable. If two chutes 8 are employed in connection with a turntable of this type for the supply of fish, it will be possible to double the number of fish which are vaccinated per hour, for example, about 5300 fish per hour. In an apparatus of this kind the curved front plates 24 may be replaced by a circumferential plate which, by additional arms is secured to the turntable. The slits 13 for the photo cell arrangement and the needle of the vaccination apparatus will in this embodiment be placed in the circumferential plate.

We claim:

1. Apparatus for separate handling of live fish and fish fry, the apparatus comprising a plurality of holders mounted on a common transport adapted to move the holders sequentially between a plurality of positions, means for enabling a separate introduction of the fish or the fish fry into the respective holders, means for detecting a presence of fish in the holder, each of said holders comprises at least two mutually movable parts arranged so as to grip fish placed in a vertical position and with a tail of the fish pointing in an upward direction, each of said holders including means for releasing the fish wherein said common transport includes a turntable on which the holders are supported on radial arms which comprise positioning means for the movable parts of the holders, said positioning means being constructed in such a manner that positioning takes place in dependence upon an angular position of the turntable, and wherein one of the movable parts of the holder includes a bottom hinged to a bottom edge of the movable part.

2. Apparatus according to claim 1, further comprising at least one outlet tube disposed at least at one of the plurality of positions into which the holders are moved, said at least one outlet tube being placed on bottoms of the holders, each outlet tube comprises a cover adapted to be positioned by a work cylinder, and wherein the bottom and the cover are provided with means adapted to interact with each other so that the bottom is opened in a downward direction.

3. Apparatus according to one of claims 1 or 2, further comprising a vaccination apparatus disposed opposite at least one of the plurality of positions into which the holders are moved, a control circuit for controlling the vaccination apparatus and remaining functions of the apparatus, and wherein the vaccination apparatus comprising means for cleaning a hypodermic needle of the vaccination apparatus and means for disinfecting the hypodermic needle.

4. Apparatus according to claim 3, further comprising at least one water pipe arranged so as to spray the respective holders with water at least at one of said plurality of positions of the holders.

5. Apparatus according to claim 4, wherein the turntable is placed on a tabletop or a part, and wherein at least a portion of the tabletop is tiltable with respect to said means for enabling separate introduction of the fish into the respective holders.

6. Apparatus according to claim 5, wherein each holder comprises exchangeable soft plastic lining having a smooth and soft surface.

7. Apparatus according to claim 6 further comprising a basin for the fish, and wherein said means for enabling separate introduction of the fish or fish fry include at least one chute from which correctly oriented fish or fish fry are guided down into the respective holders.

8. Apparatus according to claim 5, wherein said means for enabling separate introduction of the fish includes a chute for guiding the fish into the respective holders.

9. Apparatus according to one of claims 1 or 2, further comprising at least one water pipe arranged so as to spray the respective holders with water at least at one of said plurality of positions of the holders.

10. Apparatus according to one of claims 1 or 2, wherein the turntable is placed on a tabletop and wherein at least a portion of the tabletop is tiltable with respect to said means for enabling introduction of the fish into the respective holders.

11. Apparatus according to one of claims 1 or 2, wherein each holder comprises exchangeable soft plastic linings having a smooth and soft surface.

12. Apparatus according to one of claims 1 or 2, further comprising a basin for the fish, and wherein said means for enabling separate introduction of the fish or fish fray includes at least one chute from which correctly oriented fish or fish fry are guided into the respective holders.

13. Apparatus according to one of claims 1 or 2, wherein the turntable is placed on a tabletop which is tiltable with respect to said means for enabling a separate introduction of the fish.

* * * * *